Feb. 22, 1927.

A. BONTEMPI

SCULPTURING PROCESS

Filed Oct. 21, 1922     4 Sheets-Sheet 1

1,618,804

INVENTOR
Augustus Bontempi
BY
H. H. Dyke
ATTORNEY

Feb. 22, 1927.

A. BONTEMPI

SCULPTURING PROCESS

Filed Oct. 21, 1922     4 Sheets-Sheet 2

INVENTOR
Augustus Bontempi
BY
H. H. Dyke
ATTORNEY

Feb. 22, 1927. 1,618,804
A. BONTEMPI
SCULPTURING PROCESS
Filed Oct. 21, 1922    4 Sheets-Sheet 3
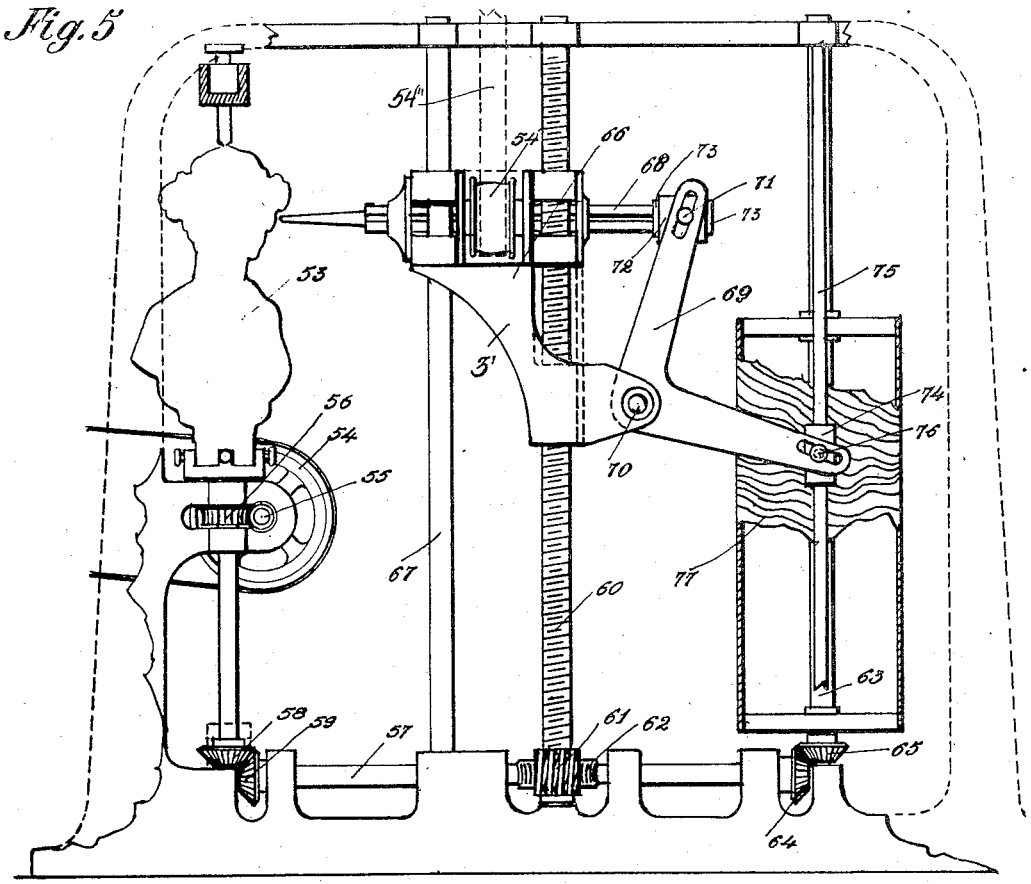
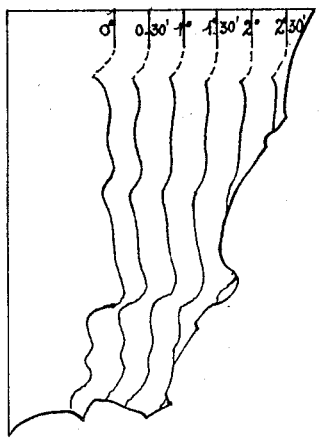
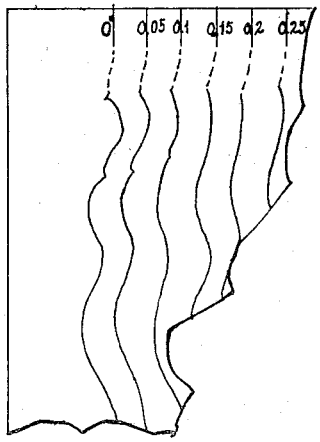
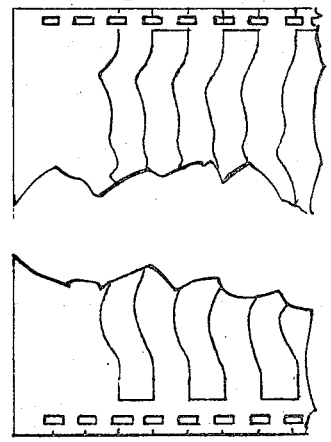
INVENTOR
Augustus Bontempi
BY
ATTORNEY Feb. 22, 1927.

A. BONTEMPI 1,618,804

SCULPTURING PROCESS

Filed Oct. 21, 1922   4 Sheets-Sheet 4

Inventor
Augustus Bontempi
By H. H. Dyke
Attorney

Patented Feb. 22, 1927.

1,618,804

UNITED STATES PATENT OFFICE.

AUGUSTUS BONTEMPI, OF COYTESVILLE, NEW JERSEY.

SCULPTURING PROCESS.

Application filed October 21, 1922. Serial No. 596,006.

My invention relates to a process of sculpturing.

Sculpturing machines have heretofore been made having a mechanically actuated cutting tool guided to move in consonance with a tracking member or finger moved in contact with the surface of the three dimensional object, as a bust, statue or the like being reproduced. With such machines it is necessary that the original three dimensional object which is being reproduced shall actually be present and in use for tracking purposes during the entire operation of carving the replica or reproduction. Furthermore, with such machines it is difficult to obtain a good degree of precision in the copy because of the fact that the original statue or other three dimensional object being reproduced and the replica thereof must be separately supported and separately displaced or moved with respect to the tracing member and the carving tool respectively. Such separate support and relative movement give rise to difficulties of manipulation and frequently lead to inaccuracies in the copies produced. Furthermore, other objections have been encountered which have interfered with such former apparatus going into extensive use, for example, vibration imparted through the mechanical control system from the rapidly rotating carving tool, which is necessarily subject to vibration, is imparted to the tracking tool, making it difficult or impossible for the operator to guide the tracking tool properly on the surface of the original statue or model while the carving operation is going on. To overcome these and other difficulties, I have devised a process of mechanical reproduction of sculptures or other three dimensional bodies wherein the steps of mechanical sculpture are divided into two stages.

The first stage consists of marking out on a flat surface, such as a sheet of paper, a series of profile lines corresponding to the original or model to be reproduced. This series of profile lines I prefer to refer to collectively as the "diagram". The second stage consists in using the lines of the diagram instead of the model for guiding the cutting tools in the actual carving operation of making the copy.

In this way the same apparatus which is used for marking the diagram is later used in a reverse sense for carrying out the carving of the replica, so that the difficulties such as above referred to are entirely avoided. In carrying out the first stage the profiles of the model are followed or tracked by a suitable stylus having the same shape and dimensions as the carving tool to be later used and disposed in the plane of the profile. This stylus is adapted by suitable connections to actuate a marking instrument as a pen or pencil to mark the corresponding profile lines on a plane surface. Arbitrary, though regular intervals, separate the planes of the various profiles followed on the model, as well as the corresponding profile lines marked on the diagram.

In the second stage of the operation the marble block or other raw material for sculpture replaces the original model. The carving tool replaces the tracking stylus of the same form and dimensions as the carving tool, and the movement of the carving tool is controlled by moving the pen or pencil or preferably a sharp pointed instrument put in the place of the pen or pencil and moved by the operator to follow the lines of the diagram.

In the drawings, Fig. 1 is a side view of a sculpturing machine, showing a paper diagram (usually blue-printed) mounted on vertical rollers, the pointer, the carving tool and the piece of statuary in course of carving;

Fig. 5 is a side view of a modified automatic sculpturing machine, where the paper diagram is replaced by a metallic or metal surfaced cylinder, on which a single, generally helical groove is sunk;

Fig. 6 shows a fragment of a paper diagram, where the record lines are spaced by degrees corresponding to successive small part rotations of the model on a vertical axis, and particularly useful in the case when the sculpture is generally round in horizontal cross-section;

Fig. 7 shows a fragment of a paper diagram, the lines being spaced by fractions of inches, especially useful in the case of bas relief or substantially flat sculptures to be carved by lateral non-rotary displacement of the tool holder;

Fig. 8 shows a fragment of a metallic diagram, where the lines are etched into grooves, said plate to be used either flat or curved around a cylinder, as in the case when an automatic machine is used.

Figure 10:
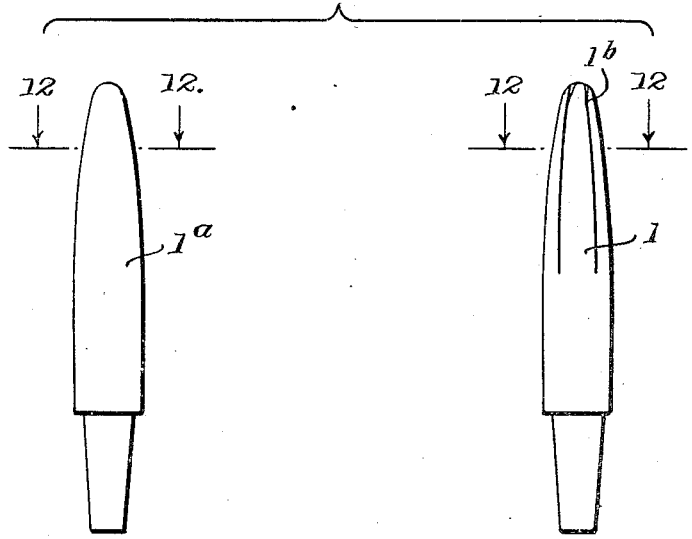
Figure 11:
Figure 12:
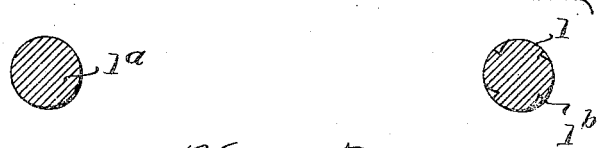
Figure 13:

Fig. 10 comprises side views of the interchangeable feeler and carving tool respectively;

Fig. 11 comprises end views of the parts shown in Fig. 10;

Fig. 12 comprises sections of the parts shown in Figs. 10 and 11 taken on the lines 12—12, Fig. 10, and Fig. 13 comprises side views of the interchangeable pointer and marking instrument.

The machine shown in Figs. 1–4 is a simple apparatus composed of three carriages moving one on another in the three dimensions of space.

The carving tool 1 is attached to a shaft 2 mounted in a horizontally movable primary carriage 3 that is fed forward and backward in the depth sense, relatively to the block 4 to be carved, said shaft 2 being driven at high speed by a flexible shaft 5. A screw 6, actuated by a handle 7 extending through a nut 8 fixed on the secondary carriage 11 referred to below and mounted to turn in the carriage 3 at 9 and 10, effects the forward and backward movements of said carriage 3.

The primary carriage 3 in its turn is mounted on a vertically movable secondary carriage 11, which includes the nut 8, there being a guide rod 12 attached to said primary carriage 3, which extends through the upper of two hollow blocks 13, 13ª, constituting a part of the secondary carriage 11. The secondary carriage 11 is mounted on two vertical and parallel screws 14, 14ª of the same pitch, extending through screw-threaded holes cut in the hollow blocks 31, 13ª, and said carriage 11 is further guided in its vertical movements by parallel guide rods 15, which as well as screws 14, 14ª, are attached to the tertiary carriage 16.

The tertiary carriage 16 comprises two blocks 17, 17ª, connected by the vertically disposed guide rods 15, and is actuated to move horizontally by two horizontal and parallel screws 18, 18ª of the same pitch, which are mounted to turn in the side posts 19, 19ª of the front frame 20.

The motion of the screws 14, 14ª for the secondary carriage are synchronized by pinions 21, 21, and an intervening idler 22, and when it is desired to operate said screws 14 and 14ª by hand, said screws may be actuated by a handle 23 attached to the idler 22, provided for that purpose. It is preferred, however, to utilize for this purpose a power-driven mechanism consisting of pinions 24, 24ª, attached respectively to the lower ends of the screws 14, 14ª, which are respectively in mesh with pinions 25, 25ª mounted to rotate on a shaft 26, there being disposed between said pinions 25, 25ª a double-acting clutch 27 adapted to engage ratchet teeth on said pinions. This clutch is splined on the shaft 26, driven by a pulley 26ª, and turns with it. Clutch 27 is actuated by a bell-crank lever 28 (which may be operated by hand, if desired).

The bell-crank lever 28 may be operated by means of a snap switch for clutch 27, the mechanism for this purpose consisting of a lever 29 pivoted at the oscillatory center 30 of said bell-crank lever 28, and forced to either side of its dead center by a spring 31. The bell-crank lever 28 has a slot 32 through which a pin 33, carried by the lever 29, extends, said slot permitting the initial movements of the lever 29 which places it on either side of its dead center, whereupon its movement to the opposite clutching relation for securing travel of the secondary carriage 11 in the opposite direction is completed by the spring 31.

The lever 29 is pivotally connected to a rod 34 having guides 35 and carrying tappets 36, 36ª extending into the path of the secondary (vertically movable) carriage 11, so that said carriage 11, in moving up and down, may actuate said rod 34 and reverse the position of the clutch 27 to thereby reverse the vertical movements of said secondary carriage, as will be understood.

The profile lines of the model may be marked on a sheet of paper 37 extending from one of two rollers 38, 38 to the other, these rollers being attached to the tertiary carriage 16 and moving with it. When these lines are being formed the pointer 39 is replaced by a marking instrument as a pencil, pen or the like 39ª, and the carving tool 1 is replaced by a simple blunt tracing instrument, stylus or feeler 1ª of the same dimensions as the carving tool. The diagram may be formed by suitable adjustments of the handle 7 which cause the feeler 1ª to follow the course of successive profiles presented when the model is turned as from one angular position to another, the marking instrument 39ª marking such profile lines on the paper as the profiles of the model are followed by the feeler moving on the model surface.

After each profile line has thus been marked on the diagram, the sheet 37 is moved to a new position in order that a succeeding profile line may be properly spaced from the preceding one. When all the desired profiles of the model have thus been traced in profile lines in spaced relation on the said sheet, the product will be what I have already designated collectively as the "diagram" corresponding to the particular model.

To carve the replica of the model this operation is reversed, the paper diagram is placed on the rollers, the marking instrument 39ª is replaced by a sharp tracking pointer 39, and the feeler or stylus 1ª by a carving tool 1 of the same shape and dimensions as the feeler or stylus, except that the carving tool 1 is provided with one or more cutting edges 1ᵇ of such form that stylus 1ª fits the track of material removed by the carving tool, as shown in Figs. 10 and 11 and indicated in dotted lines in Fig. 12. The carving tool 1 is guided in its work by the operator causing the tracking pointer 39 to travel the recorded profile line on the paper diagram.

It will be observed that the production of the diagram and the subsequent formation of the replica of the model, comprehend resultants of the vertical rectilinear movements of the secondary carriage 11, and the rectilinear movements of the primary carriage 3, and movements of the pointer 39 therewith over the sinuous lines of the diagram, and that these resultants are so qualified by the alterations in the successive angular positions of the work as to effectuate the carving thereof in the required three dimensions. Time for the accurate manipulation of the pointer, is afforded by the relatively slow movements of the secondary carriage 11.

Figure 1:
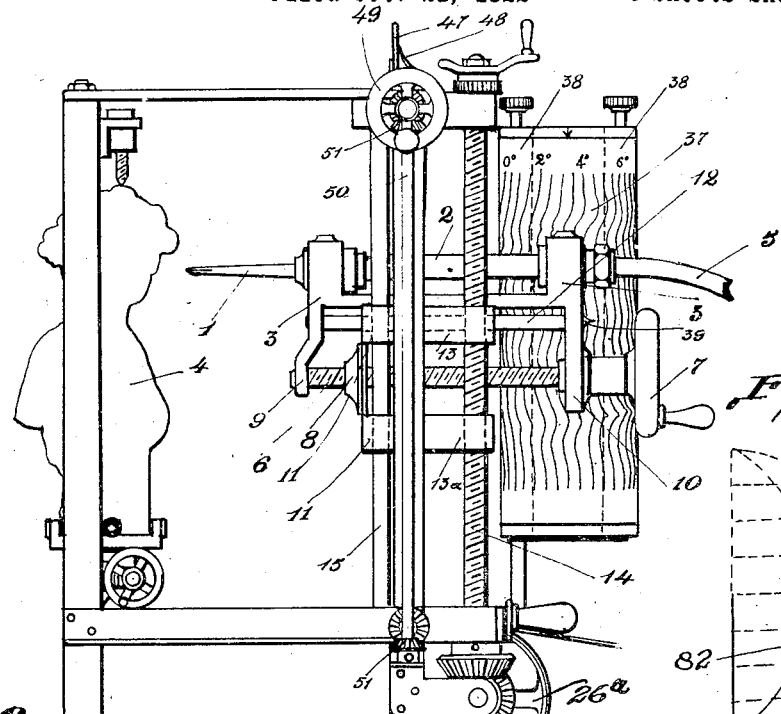

The amplitudes of the step by step angular movements of the work are measured in degrees by a graduated hand dial 40 mounted on a shaft 41 carrying a worm 42, which meshes with a worm-gear 43 secured to the spider clamp 44 on which the work is mounted, a center 45 being arranged to hold the upper end of the work. An indicating needle 46 visualizes the respective adjustments. Coordination of the positions of the diagram and of the work, is attained by a scale of degrees disposed on the diagram, as indicated in Figs. 1 and 6. For example, with a diagram with profile lines spaced at intervals of 30 minutes of a degree as represented in Fig. 6 the dial 40 is turned to move the block or the like being carved through a corresponding angle, each time the carving tool is made to traverse a new profile. Zero position on the dial 40 coincides with the zero line on sheet 37.

Figure 2:
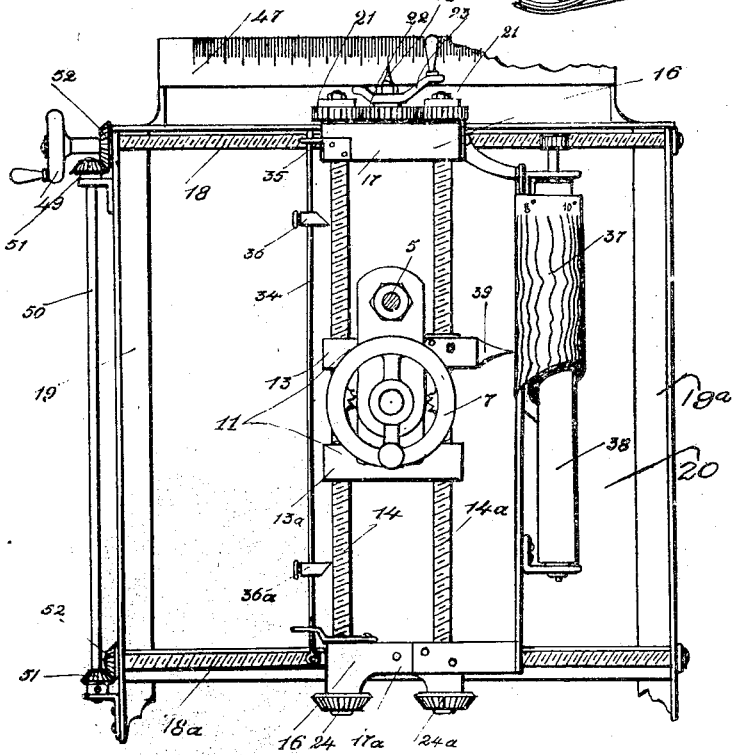
Fig. 2 is a front view of the frame that carries the diagram, showing the pointer, the carving tool holder, and part of the device for the automatic vertical displacement of the tool holder and pointer.
Figure 3:
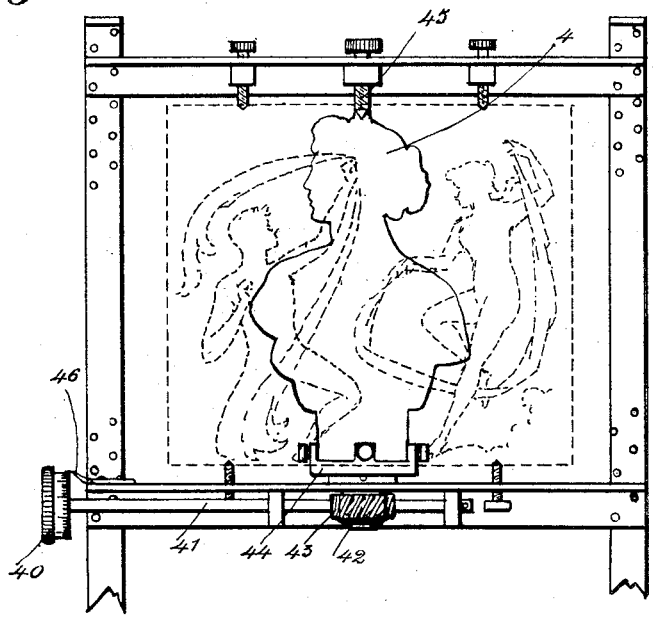
Fig. 3 is a front view of the frame that holds the piece of material to be carved, showing also the means for determining the various angular positions of the work.
Figure 4:
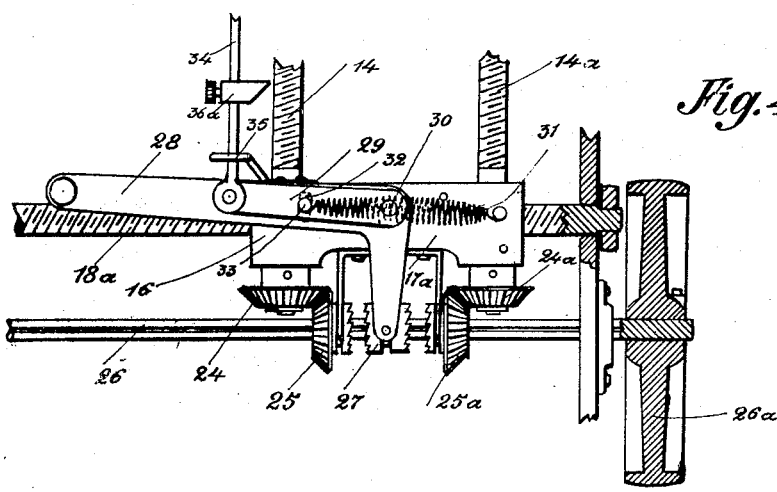
Fig. 4 shows a detail of the device for producing automatic movements of the tool holder and pointer holder.

If the product of the machine is to be a bas relief or flat sculpture, as shown by dotted lines in Fig. 3, the scale (47, Figs. 1 and 2) will indicate rectilinear dimensions instead of degrees (see Fig. 7). The same machine may contain scales of both kinds, the rectilinear scale 47 being disposed at the top of the machine, and the tertiary carriage 16 having a pointer 48 associated with said scale, as shown in Fig. 2.

The tertiary carriage 16 is actuated by a handle 49, which is attached to one of the screws 18, 18ª, these screws being synchronized by a shaft 50 having, as its ends, pinions 51 meshing with pinions 52 fixed on said screws.

The operation of the machine is simple and will be readily understood without extended explanation, the distinctive character of the invention being the segregation of the tracing operation from the carving operation, and the production of a diagram delineating various profiles of a model and capable of being used as a guide for the operator, who is engaged in manipulating the carving tool. Such a diagram offers no substantial resistance to impede the free movements of the feeler as it passes over the successive contours of the model, and the recording of the desired profiles may, therefore, be attained with great accuracy. Likewise, in carving the work, the operator is unhampered by the resistance of a feeler moving over a model, as was the case in previous sculpturing machines in which the tracing of the profiles of a model and the carving of a replica thereof were simultaneous, the movements of the pointer along the lines of the diagram in the present device being substantially unretarded and the resistance offered thereby being negligible.

The present invention also makes it possible to carve stone automatically, dispensing entirely with any human assistance. For this purpose the diagrams of a statuary model can be marked on metallic surfaces, from which they may be automatically reproduced in stone.

A metallic sheet, previously coated with wax, or other acid-proof substance, may be substituted for the paper in making the diagram, and the tracer replaced by a steel stylus. With this arrangement, the record lines will be scraped off through the wax, so as to make it possible to etch them into the metal, producing grooves of any desired depth.

In this case the consecutive lines are connected at the top and at the bottom, as shown in Fig. 8, thus making a diagram having a continuous single line. The lines can be etched in various ways, as, for example, by means of acids, or electrolytic processes, or the like. The metal diagrams can have various forms, as, for example, they may be flat, or curved on a cylinder.

In the carving stage of the work produced automatically from the metallic grooved "diagram", the screw 6 that gives the depth feed of the tool 1, is replaced by a plain rod freely slidable in its guide-holes, (such slidable rod may also be used in making the "diagram") and the index 39 is replaced by a pointed steel stylus that extends into the guide lines, and is consequently guided by them in the vertical automatic motion of the tool carriage.

Instead of a number of profile lines, a continuous helical line on a cylindrical surface can be used (Fig. 5), especially when the sculpture is round and without bold reliefs and depressions. If, when taking the diagram, the model is turned uniformly around its vertical axis, and a cylinder covered with paper or a metallic sheet, turns in synchronism therewith, while the blunt tracer and the marking point are fed slowly and uniformly in a vertical sense, a generally spiral line will be traced. The diagram cylinder is placed perpendicular to the axis of the model or the tracer is placed at the end of a crank-lever, so as to obtain the same result. The record line will thus appear of sinuous character, as shown in Fig. 5, while following a generally spiral course.

To show how a device can perform the carving operation wholly automatically, I choose a case when a grooved metallic cylinder is used, instead of a flat plate.

Fig. 5 shows a bust 53 mounted on a spider clamp turned constantly and uniformly by the pulley 54, through the worm 55 and the gear 56. Such rotary motion is transmitted to a horizontal shaft 57 by means of the bevel gears 58 and 59. This latter shaft, in its turn, transmits rotary motion to the vertical screw 60 through the worm 61 and the gear 62, and to the vertical axis of the record cylinder 63, by means of the bevel gears 64 and 65. The tool holder 66 is raised and lowered by the screw 60, guided also by the column 67. The tool holding shaft has a key-way for the pulley 54', which is retained between the two sides of the tool holding frame. Thus, while the pulley 54' turns the tool shaft 68, it leaves tool shaft 68 free to move axially. The pulley 54' is driven from belt 54".

A bell-crank lever 69 is pivoted at 70 on an extension of the tool holding frame 3'. Its upper end has a slot that engages the stud 71 projecting from sleeve 72, which turns but does not slide on the tool shaft 68, being received between collars 73, 73. The movement of lever 69 and sleeve 72 moves the shaft 68 forward and backward.

The lower end of the lever 69 is similarly engaged with another sleeve 74 that runs along a guide-rod 75, which has, on the internal side a steel stylus 76 whose pointed end is guided in and actuated by the spiral groove line of the cylinder 77.

The working of this apparatus is as follows: While the block of material to be carved, and the diagram cylinder turn synchronously, the carving tool travels very slowly, say, from the top to the bottom, thus following a generally spiral line. Such line will be sinuous, according to the depressions and convexities of the model.

If the lower arm of the lever 69 is shorter than the other one, the groove lines will have sinuosities of less sharp character and the sliding of the guiding stylus will be easier, while the corresponding line carved on the bust will have the normal value. The same result can be obtained by using a larger cylinder. In any case the diagram and the replica must be made by using the same means, if an exact duplicate of the model is wanted.

When the sculpture has to proceed by degrees, that is by strata, in order to prevent the tool from cutting too deep into the marble, stone, wood or other material, the process may be divided into two or more stages, by using first a short tool, and increasing its length gradually up to the normal. This applies also to the cases when flat diagrams are used, unless the blocks are previously roughened down by hand or other means. In the case of the device represented in Fig. 1, such phasing of the work can be obtained also by displacing forward the position of the pointer or shifting back the diagram.

Figure 9:
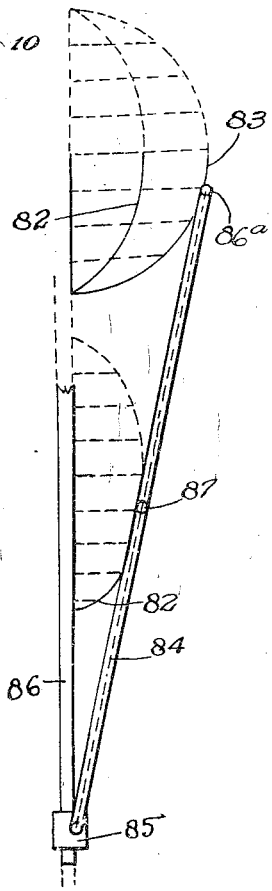
Fig. 9 is a diagrammatical view indicating how a pantographic element may be used for enlarging or reducing the relief values of the curves.

The enlargements and reductions of the sculptures are easily obtained by making dimensional alterations on the diagrams by pantographic or photographic means. In the course of such operations the relief values can be decreased or increased for many purposes by means of a modified pantograph, as shown in Fig. 9, also for reducing a full relief sculpture into a bas relief, or vice versa.

It will be seen that numerous advantages are secured by the present invention. The production of the "diagram" or delineation on a preferably plane surface of profiles or other elements of a three dimensional body, such as a statue, living person, or the like, is accomplished as an entirely distinct and separate step from the carving operation, which may be performed at any subsequent time or the diagram may merely be kept on hand ready for use in performing the carving operation whenever orders are obtained for the particular statuary subject delineated thereon. The step of making the diagram being thus separated from the carving operation can be completed in a relatively short time, the production of a statuary or copies of statuary is made as precise and accurate as may be desired without loss of artistic value, and with no distortions, such as may result from the carving operation being carried on simultaneously with tracing the model, the diagram may be used as many times as required without any loss of accuracy from repeated use, which is a feature of great importance where numerous copies are desired, as in the case of carved capitals or pedestals for columns and the like and once the diagram is secured no further reference to the original is necessary, proportional effects can readily be secured as bas reliefs from statues of full relief and still other features of advantage are secured, which need not be set out in detail.

I claim:

The process of sculpturing, which comprises the steps of making a linear record representative of element lines of a three-dimensional body as followed by a tracking stylus of relatively blunt, rounded end formation, and thereafter performing the operation of carving a replica of the body traced, with a rotary carving tool of substantially the same end formation as the tracing stylus, using the linear record to determine the movement of the carving tool.

In testimony whereof, I have signed my name hereto.

AUGUSTUS BONTEMPI.